United States Patent
Hahn et al.

(10) Patent No.: US 10,480,505 B2
(45) Date of Patent: Nov. 19, 2019

(54) ARRANGEMENT FOR SPECIFYING A PRESSURE

(71) Applicant: ebm-papst St. Georgen GmbH & Co. KG, St. Georgen (DE)

(72) Inventors: Alexander Hahn, Eigeltingen-Heudorf (DE); Marcus Hellmann, Unterkirnach (DE); Michael Kisch, St. Georgen (DE); Jens Loeffler, Villingen-Schwenningen (DE); Manfred Bitzer, Freiburg (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 475 days.

(21) Appl. No.: 14/942,145

(22) Filed: Nov. 16, 2015

(65) Prior Publication Data

US 2017/0089337 A1    Mar. 30, 2017

(30) Foreign Application Priority Data

Sep. 30, 2015   (DE) .................... 20 2015 105 177 U

(51) Int. Cl.
| | |
|---|---|
| *F04C 14/06* | (2006.01) |
| *F04C 2/10* | (2006.01) |
| *F04C 2/12* | (2006.01) |
| *F04C 18/10* | (2006.01) |
| *F04C 18/12* | (2006.01) |

(Continued)

(52) U.S. Cl.
CPC .............. *F04C 14/06* (2013.01); *F04C 2/102* (2013.01); *F04C 2/126* (2013.01); *F04C 15/008* (2013.01); *F04C 18/10* (2013.01); *F04C 18/126* (2013.01); *F04C 28/06* (2013.01); *F04C 29/0085* (2013.01); *G01L 5/26* (2013.01); *H02P 1/16* (2013.01); *F04C 2240/40* (2013.01); *F04C 2270/025* (2013.01)

(58) Field of Classification Search
CPC ...... F04C 14/06; F04C 18/10; F04C 29/0085; F04C 28/06; F04C 18/126; F04C 15/008; F04C 2/126; F04C 2/102; F04C 2240/40; F04C 2270/03; F04C 2270/025; G01L 5/26; H02P 1/16
See application file for complete search history.

(56) References Cited

U.S. PATENT DOCUMENTS

| | | | | |
|---|---|---|---|---|
| 5,813,490 A | * | 9/1998 | Takasaki ............ | B60K 23/0808 180/250 |
| 6,035,252 A | * | 3/2000 | Dixon ................. | F02D 41/1402 701/102 |

(Continued)

OTHER PUBLICATIONS

Japanese Office Action dated Dec. 13, 2018, which issued in the corresponding Japanese Patent Application No. 2018121001976090.

(Continued)

*Primary Examiner* — Mohammad K Islam
(74) *Attorney, Agent, or Firm* — Dickinson Wright PLLC

(57) ABSTRACT

An arrangement (100) for specifying the pressure (64), produced by a pump (30) driven by an electric motor (31), includes a processor (116) which derives a target pressure value (62, 118) from an internal torque value (114) and a loss torque (108). The arrangement (100) further derives (112) the internal torque value (114) from a motor current value (110) and a motor constant $k_e$.

11 Claims, 4 Drawing Sheets

(51) Int. Cl.
*F04C 28/06* (2006.01)
*F04C 29/00* (2006.01)
*F04C 15/00* (2006.01)
*G01L 5/26* (2006.01)
*H02P 1/16* (2006.01)

(56) References Cited

U.S. PATENT DOCUMENTS

| | | | | |
|---|---|---|---|---|
| 6,244,839 | B1 * | 6/2001 | Cole | F04C 2/102 |
| | | | | 418/171 |
| 6,244,843 | B1 | 6/2001 | Kosuge | |
| 6,332,522 | B1 * | 12/2001 | Morse | F16D 43/284 |
| | | | | 192/35 |
| 6,386,836 | B1 | 5/2002 | Johnson | |
| 7,037,081 | B2 | 5/2006 | Allington et al. | |
| 8,249,791 | B2 * | 8/2012 | Baumgartner | F16D 65/183 |
| | | | | 188/72.3 |
| 8,707,932 | B1 * | 4/2014 | Marin | F02D 41/3082 |
| | | | | 123/479 |
| 9,388,940 | B2 * | 7/2016 | Conley | F16N 7/14 |
| 9,768,649 | B2 * | 9/2017 | Karwath | H02P 6/20 |
| 2002/0096060 | A1 * | 7/2002 | Kohno | B30B 1/186 |
| | | | | 100/35 |
| 2004/0062658 | A1 * | 4/2004 | Beck | E21B 43/126 |
| | | | | 417/42 |
| 2004/0187835 | A1 * | 9/2004 | Hoff | F01M 1/16 |
| | | | | 123/196 R |
| 2009/0152054 | A1 | 6/2009 | Baumgartner et al. | |
| 2010/0018808 | A1 * | 1/2010 | Gloge | F16H 61/0031 |
| | | | | 184/6.12 |
| 2010/0175401 | A1 * | 7/2010 | Taguchi | F04B 27/1804 |
| | | | | 62/228.3 |
| 2010/0264885 | A1 * | 10/2010 | Olsen et al. | F16H 61/444 |
| | | | | 322/40 |
| 2011/0206537 | A1 * | 8/2011 | Simpson | E02F 9/207 |
| | | | | 417/1 |
| 2012/0112524 | A1 * | 5/2012 | Shibata | B60T 13/146 |
| | | | | 303/10 |
| 2012/0159939 | A1 * | 6/2012 | Xie | F16H 1/0025 |
| | | | | 60/327 |
| 2012/0263604 | A1 * | 10/2012 | Jung | E02F 9/2235 |
| | | | | 417/1 |
| 2012/0293106 | A1 * | 11/2012 | Hirt | H02P 23/26 |
| | | | | 318/722 |
| 2012/0324865 | A1 * | 12/2012 | Habumuremyi | F01N 3/208 |
| | | | | 60/274 |
| 2013/0004337 | A1 * | 1/2013 | Anderson | F04B 49/065 |
| | | | | 417/53 |
| 2013/0013159 | A1 * | 1/2013 | Moriki | B66F 9/20 |
| | | | | 701/50 |
| 2013/0221676 | A1 * | 8/2013 | Caldwell | F04B 17/02 |
| | | | | 290/55 |
| 2013/0251540 | A1 * | 9/2013 | Paulus | F04B 49/065 |
| | | | | 417/22 |
| 2014/0274529 | A1 * | 9/2014 | Edler | F16H 48/22 |
| | | | | 475/150 |
| 2015/0071804 | A1 * | 3/2015 | Parsons | F04C 2/086 |
| | | | | 418/1 |
| 2017/0023075 | A1 * | 1/2017 | Nozu | F16D 48/066 |
| 2017/0097087 | A1 * | 4/2017 | Flaxman | F16H 57/0439 |

OTHER PUBLICATIONS

Melexis, MLX81200 BLDC Motor Controller Product Abstract Rev 2.4, Jun. 2012, pp. 1-15, Novi, Michigan.

* cited by examiner

ARRANGEMENT FOR SPECIFYING A PRESSURE

CROSS-REFERENCE TO RELATED APPLICATIONS

This application claims priority from our German utility model application 20 2015 105 177.8 filed 2015 Sep. 30.

FIELD OF THE INVENTION

The present invention relates generally to maintaining proper lubrication in rotating machinery and, more specifically, to methods and apparatus for maintaining proper oil pressure in a motor or pump having at least one rotating element. It is directed to an arrangement for specifying a pressure, a control apparatus for controlling a pressure, and an apparatus for driving a pump.

As defined herein, a pump is a driven machine which serves to transport fluids. This includes also mixtures of fluids and solids, pastes, and fluids with small components of gases. During operation of the pumping apparatus, the driving power is transformed into the kinetic energy of the fluid transported.

BACKGROUND

Patent document DE 10-2011-08657-2-A1 and corresponding US 2013/0251540-A1, PAULUS & SCHAAB/KSB, published 26 Sep. 2013, disclose a method and a control device for RPM-variable control of a displacement pump apparatus. The displacement pump apparatus includes a displacement pump and a drive, consisting of an electrical drive motor and a frequency converter. A final or output pressure of the displacement pump is, via a control device, adjusted to a target or setpoint value. The control device makes adjustments, based upon instantaneous values provided by the drive. Thereby, the control device regulates to the target or setpoint value.

SUMMARY OF THE INVENTION

Building upon this prior art, applicants propose an apparatus which calculates an internal torque value as a function of temperature and a motor RPM value, calculates a loss torque value as a function of temperature and a motor RPM value, and then derives a target pressure value to be produced by the pump, as a function of the difference between the internal torque value and the loss torque value.

The apparatus includes a pressure controller which, based upon a difference between an instantaneous fluid pressure value and a target pressure value, generates a setpoint value which influences power supplied to the pump's driving electric motor, to thereby bring the instantaneous pressure value toward the target pressure value.

The electronic controls for the pump-motor combination include a changeover switch for selectively applying one of two output signals from respective control modules, namely from a speed ramp-up module for starting the pump-motor combination, and a continuous operation module including a proportional-integral controller which processes feedback output signals from the pump-motor combination to maintain desired pressure values. Preferred embodiments are detailed in the description below.

An arrangement for ascertaining the pressure, created by a pump driven by an electric motor, is proposed, in which the pressure is calculated on the basis of a difference between an internal torque and a loss torque. The arrangement is further configured to calculate the internal torque from a motor current value and motor constant.

In one embodiment, the loss torque is calculated from a temperature, particularly an oil temperature, and from a motor RPM.

Further, one can provide that the loss torque is determined by using a characteristic field diagram or look-up matrix.

The proposed arrangement is particularly adapted for use in a displacement pump. This displacement pump can be formed as a geared pump, in particular as an annular gear pump. An alternate displacement pump type is the impeller pump. It has been found that the detection of instantaneous pressure via the torque in a displacement pump works well, especially in the case of annular gear pumps or gerotor pumps. In the case of annular gear pumps and gerotor pumps, the outer annular gear behaves like a plain bearing, and over a wide operating range, fluid lubrication occurs between the components. This results in the detection of the instantaneous pressure functioning relatively precisely. Conversely, as soon as mixed friction occurs as, for example, happens with vane cell pumps in a relatively wide operating range, the determination of the instantaneous pressure becomes imprecise. Thus, the use of an annular gear pump or a gerotor pump is advantageous for the aforementioned detection of the instantaneous pressure.

In a further refinement, the proposed arrangement serves for the detection of a pressure, which is created by a gerotor pump.

The arrangement can be configured to specify an instantaneous pressure for purposes of pressure regulation or control. The instantaneous pressure is, in this case, the pressure which the proposed apparatus is designed to control.

It is further proposed to provide a control apparatus for specifying the pressure to be generated by a pump, having a controller which generates, at its output, a setpoint value, based upon a difference between two input values, namely an instantaneous pressure value and a target pressure value. The control apparatus instructs, using a controller for specifying the instantaneous value. As controller, a controller of the above-described type is preferred.

According to one embodiment, a PI (Proportional-Integrating) controller serves as the controller. Suitable PI controllers can be implemented using ordinary integrated circuits (IC) like microcontrollers. Ready-to-use PI controllers are also commercially available from Analog Devices Inc. of Norwood Mass., Microchip Inc. of Chandler Ariz. and from other semiconductor manufacturers. Explanations of PI and PID (Proportional-Integrating-Derivative) controllers can be found in Wikipedia and in many electrical engineering treatises, as well as in application notes from IC manufacturers.

Further, it is proposed to employ an apparatus for operating a pump having a control apparatus of the aforementioned type, a module for carrying out a sequence of start-up steps such as, for example, a ramp-up of speed, and a changeover switch for performing a changeover from a start-up mode, controlled by the start-up module, to a continuous-operation mode, controlled by the PI controller.

The proposed apparatus for specifying a pressure makes it possible to assure maintenance of stable pressure. Additionally, it is thereby possible to perform pressure control without using a pressure sensor. The proposed arrangement is described herein, primarily in connection with pressure regulation, i.e. with a closed-loop pressure controller. However, the arrangement is not limited to this use, and can be employed whenever specifying a pressure is necessary.

Further advantages and refinements of the invention will be apparent from the specification and the accompanying drawings.

It is to be understood that the above-described features, and the additional features described below, can be used, not just in the preferred combinations described, but also in other combinations or by themselves, without exceeding the scope of the present invention.

The invention is schematically illustrated by various embodiments in the drawings, and is schematically and thoroughly described with reference to the drawings.

BRIEF FIGURE DESCRIPTION

DETAILED DESCRIPTION

Figure 1:
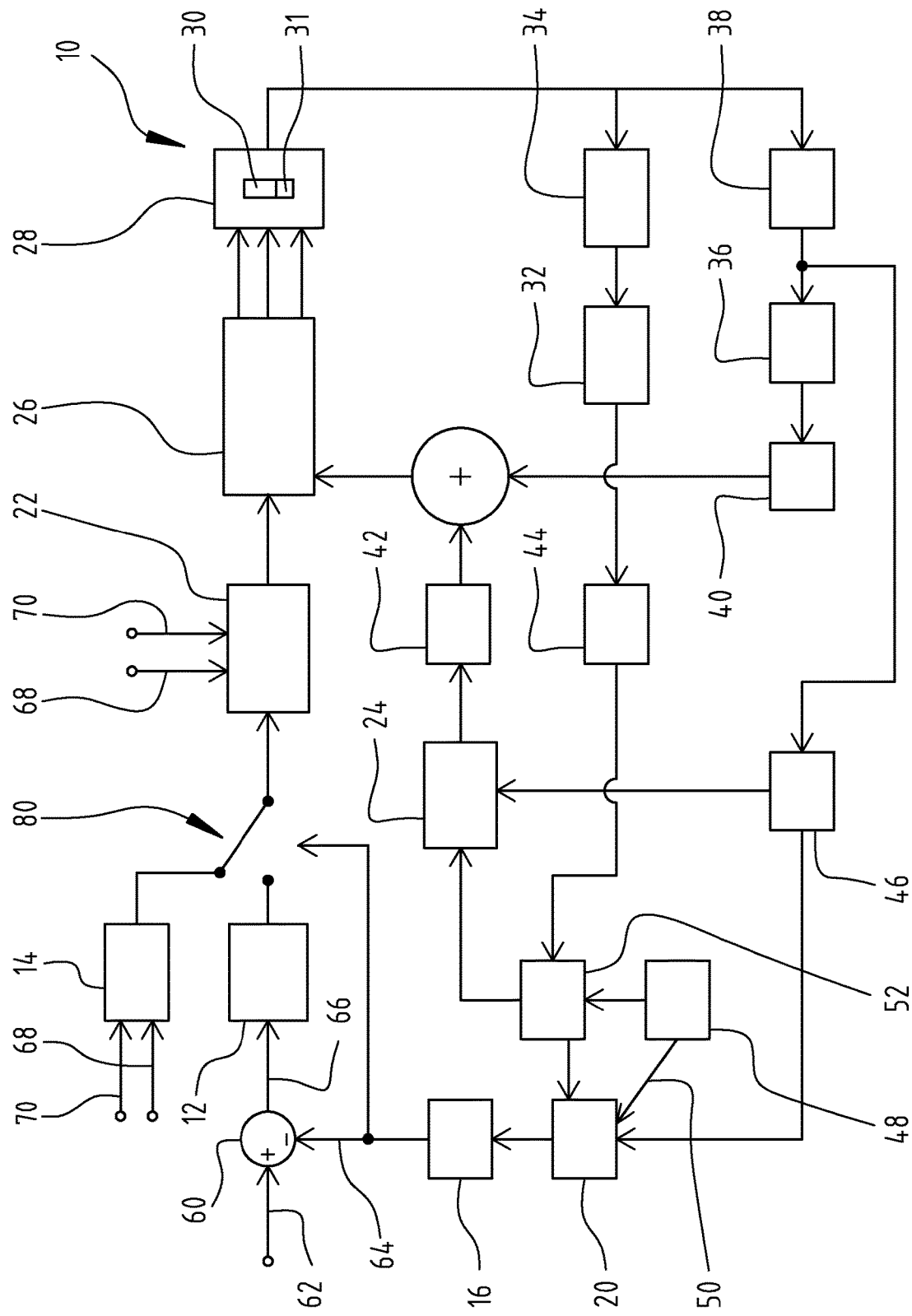
FIG. 1 is a block diagram of the structure of an embodiment of the proposed control apparatus.

FIG. 1 shows the structure and components of a control apparatus, collectively designated by reference numeral 10. The illustration shows a controller 12, in this preferred embodiment a PI (Proportional Integrating) controller, a speed-ramp 14 which serves for control of startup, an IIR (Infinite Impulse Response) filter 16 of eighth order, a pressure stage 20, a limiter 22, a lead-angle filter 24, a rotating field generator 26, a controlled system 28 in which the pump 30 and its driving electric motor 31 are contained, an average-value former 32, an analog-to-digital converter (ADC) 34 to which is applied a signal representative of the current through the electric motor 31, a module 36 for conversion of a time interval to an angle value, an IIR filter 38 of fourth order which receives an RPM-representative signal, particularly the time interval between zero-passages of the Hall signal, and converts it into a rotation-speed signal n, an integrator 40, an IIR-filter 42 of eighth order, an IIR filter 44 of second order, a 1/T unit 46 which converts the time interval between zero-passages of the Hall (rotational position) signal into a rotation-speed value n, a module 48 which furnishes, e.g. via a LIN-bus 50, a value T representing the temperature, and a module 52 which furnishes a motor constant $k_e$.

The drawing further shows a switch 80 for switchover between the output of the speed-ramp 14 and the output of the PI controller 12, i.e. switch 80 selectively couples one of these two outputs to the input of limiter 22. The switchover happens as a function of the output signal of IIR filter 16, which in turn depends upon the instantaneous-pressure signal 64 from pressure module 20, shown on the left side of FIG. 1.

Depicted at top left is a unit 60 which receives a target pressure value 62 and an instantaneous pressure value 64. From these, it calculates a control deviation value ΔP 66. Speed-ramp unit 14 receives, as input signals, an RPM value n 68 and a supply voltage VS. These two parameter values are also applied to inputs of limiter 22, as shown at top center.

Since, at the start-up, the controller 12 might accelerate the electric motor at a slower-than-optimal pace, there is provided, for start-up purposes, the aforementioned speed-ramp 14, which performs start-up tasks. Speed-ramp 14 drives electric motor 31 with a maximal, or at least large, start-up power. The changeover from applying the speed-ramp 14 output to applying the controller 12 output is triggered on the basis of the estimated instantaneous pressure. When the instantaneous pressure is, for example, less than 90% of the target value, the speed-ramp is kept active. Conversely, when the instantaneous pressure value is, for example, more than 97% of the target pressure value, then controller 12 is made active. The factors of controller 12, particularly the amplification factor of the PI controller therein, can be adjusted empirically at the test-stand.

The electric motor 31 can be controlled by a software program executed in a microcontroller, i.e. all parts of FIG. 1 except the controlled system 28 with the electric motor 31 itself and the pump 30 can be implemented and executed as a program inside a microcontroller. A suitable microcontroller is the MLX 81200 brushless DC motor controller available from MELEXIS Semiconductor of Novi, Mich. and Tessenderlo, Belgium. Further details are available from the manufacturer in their 15-page MLX 81200 Product Abstract, version 2.4, published June 2012; pages 5-6 thereof show typical configurations with LIN-bus connections. Motor control can be used to achieve sinus-commutation, since such an electric motor operates with particularly low noise. While control of electric motor by applying a sinusoidal voltage is one possibility, one could also employ Field-Oriented Regulation (FOR) with a current controller. FOR is advantageous for control purposes because the electric motor can then react more quickly. Control apparatus 10 is typically driven as a function of pressure.

Further, conversion, from time-intervals between Hall-signal flanks into angle increments, can be performed in synchrony with the rotation speed. The time intervals can be incremented at every second PWM (Pulse Width Modulation) interrupt during program execution. Further, the calculation of the current angle can be done every 100 microseconds. Thus, polling or sampling of the Hall-sensor signals is done in each PWM-interrupt. The filtering is done, not time-synchronously, but rather in dependence upon RPM or Hall-flanks.

Figure 2:
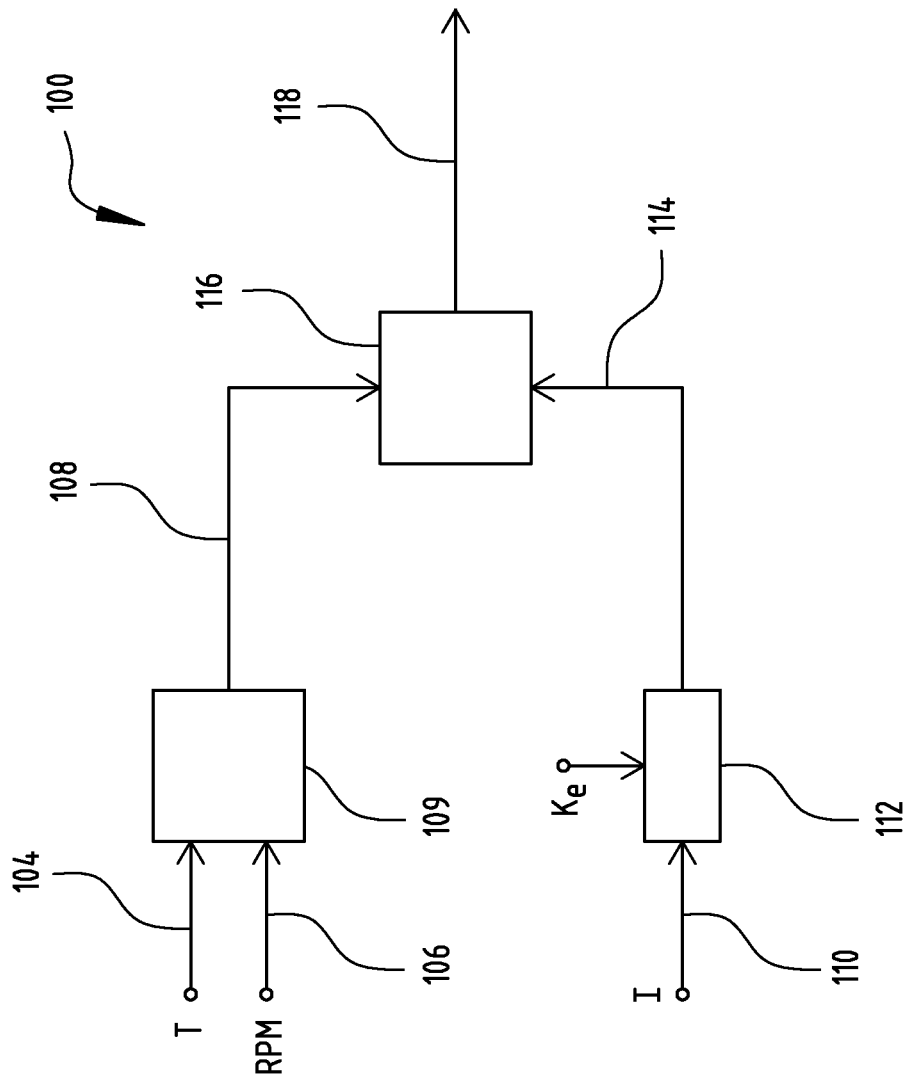
FIG. 2 is a block diagram of an embodiment of the arrangement for specifying pressure.

FIG. 2 is a block diagram of an arrangement for ascertaining a pressure; the arrangement is collectively designated by numeral 100. At top left is shown a characteristic matrix unit 102 which receives, as inputs, an oil-temperature signal 104 and a motor RPM signal 106. At its output, it produces a signal My 108 representing loss torque.

The oil-temperature signal 104 can, for example, be measured in a pump 30. In case of installation in a transmission, it can be measured in a different location, for example in the transmission oil pan, and can be fed to the arrangement for ascertaining the pressure.

In a motor vehicle, a temperature value can be transmitted via a Local Interconnect Network (LIN) bus.

The rotation speed n can be provided, for example, in RPM units. The motor constant ke can either be taken to be identical for all motors in the same production series, or each electric motor can be calibrated individually. For higher precision, the motor constant ke can be provided as a function of temperature, since it is temperature-dependent.

It is to be noted that the pressure is not measured, but rather is ascertained on the basis of motor RPM, motor current and oil temperature. The instantaneous pressure is the ascertained pressure existing at the pump output. The oil temperature is, for example, the oil sump temperature, as transmitted via a LIN-bus to the control apparatus. The pressure difference ΔP of a gerotor pump or annular gear pump is calculated by the equation $$\Delta P = M_{TH} * C \quad (1)$$

where C is a pump-dependent constant and $M_{TH}$ is the theoretical rotational torque, which achieves the generation of pressure and therefore can also be called the "pressure torque."

The theoretical torque $M_{TH}$ derives from the internal torque $M_I$ and the loss torque Mv according to the equation:

$$M_{TH} = M_I - Mv \quad (2)$$

The aforementioned internal torque $M_I$ is calculated by:

$$M_I = 3^{1/2}/2 \cdot Ke_{max}(1 + (T_{AMB} - 20) \cdot \text{Temp\_Koeff}) \cdot I \quad (3)$$

where these equation terms are as follows:

TABLE 1

| SYMBOL | DESCRIPTION | UNITS | VALUE | COMMENT |
|---|---|---|---|---|
| $Ke_{max}$ | Motor Constant | Vs/rad | 0.022749 | meas.-derived |
| I | meas. current | Amps | | |
| $T_{AMB}$ | Oil Temp.(LIN) | ° C. | | Ambient Temp. |
| Temp_Koeff | rev. Temp. Coeff | %/K | −0.11 | Data Table Value |

As motor current I, the current through the windings can be measured, or the current in the end-stage corresponding to this current, or in a DC motor, the current in the DC link circuit.

The pump-dependent constant derives from the equation:

$$C = (V_{TH}/2\pi)^{-1} \quad (4).$$

The displacement volume or chamber volume $V_{TH}$ corresponds to the volume of the fluid quantity, which is conveyed by one rotation of the pump. For example, the chamber volume for one of the test pumps is about $V_{TH} = 2.21 \cdot 10^{-6}$ m$^3$. The pump parameters were measured at 70° C.

Derivation of the Characteristic Field Matrix

Figure 3:
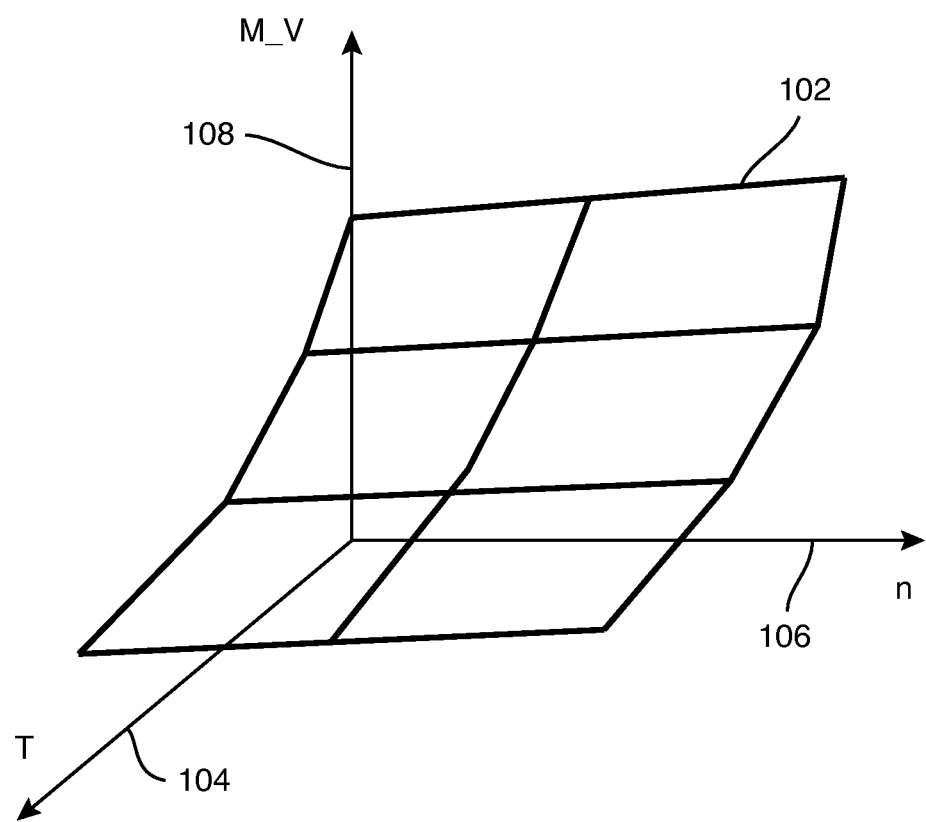
FIG. 3 is a graphic representation of a performance characteristic field or matrix for ascertaining a loss torque.

FIG. 3 shows an example of a characteristic field matrix 102 for the loss torque $M_v$. Only a few points of the matrix are presented but, in practice, in dependence upon the desired precision and the desired operating range, more points will be used.

The characteristic matrix 102 for the loss torque Mv can, for example, be empirically derived at a test-stand. For this purpose, multiple RPM- and temperature-dependent test runs are made, and the pressure difference ΔP, the rotation speed n and the motor current I of the electric motor are measured.

Using Equation (1), at each test run, the theoretical torque $M_{TH}$ is calculated and, using equation (3), the internal torque $M_I$. With the aid of Equation (2), one can derive, from the theoretical torque $M_{TH}$ and the internal torque $M_I$, the loss torque $M_v$ and can store these as part of the characteristic field data.

The loss torque Mv depends, nearly linearly, upon the rotation speed and depends, logarithmically upon the temperature.

Tests were performed with the pump and the inventors achieved the necessary precision of the actual pressure, in the range from 3.0 bar to 4.2 bar.

Figure 4:
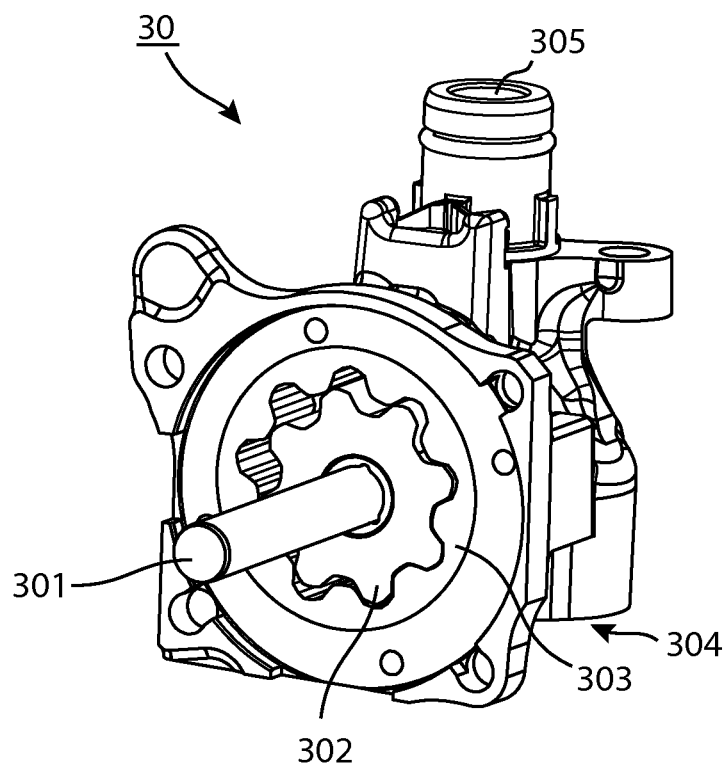
FIG. 4 shows a gerotor pump.

FIG. 4 illustrates an example of a gerotor pump. As of November 2015, the Wikipedia online encyclopedia has an article on hydraulic pumps which includes an animated illustration of a gerotor pump, in operation.

The rotor of pump 30 has an inner gearwheel 302 and an outer toothed ring 303, whose inner teeth mesh with those of the inner gearwheel.

Inner gearwheel 302 and outer ring 303 are arranged eccentrically with respect to each other, and they have a differing number of teeth. Therefore, inner gearwheel 302 and toothed ring 303 rotate at different respective speeds, so that, during rotation, the size of the void between the teeth fluctuates between a maximum volume and a minimum volume.

Pump 30 has a fluid inlet port 304 and a fluid outlet port 305.

Inlet port 304 is in fluid communication via a channel (not shown) with a front side of inner gearwheel 304 and outer toothed ring 305 at a region where (for a particular rotation direction) the void size increases and a suction develops, and the outlet port 305 is in communication via a channel (not shown) with a front side of inner gearwheel 302 and outer toothed ring 303 at region where the void size decreases and therefore a pressure rise develops, so that the fluid to be conveyed is expelled.

Figure 5:
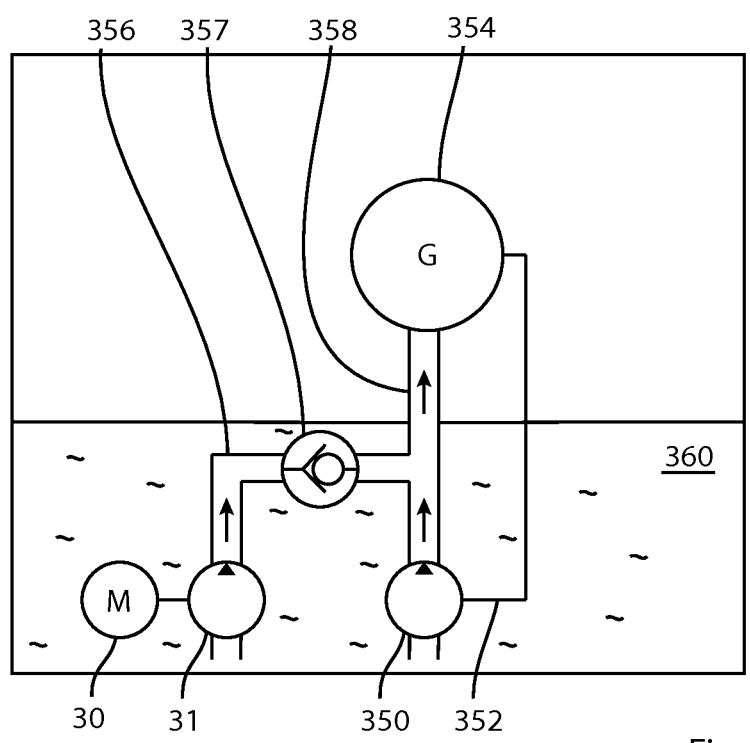
FIG. 5 is a schematic diagram of a transmission with a pump.

FIG. 5 shows a possible schematic structure of a transmission 370 with a schematically indicated housing 372, adapted to receive transmission oil 360. The actual mechanical transmission gears 354 must, during operation, be lubricated with transmission oil 360. For this purpose, a first transmission oil main pump 350 is provided, which is mechanically driven from transmission 354 via a (schematically indicated) apparatus 352, and which pumps transmission oil 360 via a conduit 358 to transmission 354. However, main pump 350 only functions when transmission 354 is in motion. When transmission 354 is stationary, the mechanically driven main pump 350 is not active, and a lubrication of transmission 354 is not assured, particularly upon start-up of the transmission 354. Accordingly, it is necessary to provide the transmission oil auxiliary pump 31 driven by electric motor 30 and this can, as needed, pump transmission oil 360 via conduit 356 and nonreturn valve 357 into conduit 358 and thence into transmission 354. Nonreturn valve 357 is provided, in order to prevent any transmission oil flow from main pump 350 into auxiliary pump 31. The transmission oil 360 pumped up to transmission 354 subsequently flows back down, and can be pumped back up anew. Pump 31 can, alternatively, also be employed as the transmission oil main pump.

Naturally, within the scope of the present invention, many refinements and modifications are possible.

For example, although the matrix KF 102 is presented above as two-dimensional, associating an oil temperature input value 104 and a motor speed input value 106 with a loss torque output value Mv 108, the matrix could be defined by a plurality of values.

The Function $$Mv = KF(T\_104, n\_106)$$

can also be defined as an approximating equation, or one can interpolate between a small number of given values.

The individual parameters, which are described on the foregoing pages, can either be specified for the entire production run of a particular pump model number, or the parameters can be derived from test for each pump of the production series. The latter procedure is advantageous, for example, in the determination of the motor constant Ke, since this constant can vary from motor to motor.

What is claimed is:

1. Apparatus (100) for specifying pressure (64) generated by a pump (30) driven by an electric motor (31), said apparatus comprising:
the electric motor (31) configured to drive the pump (30);
a source (46, 20, 16) of instantaneous fluid pressure values (64) and a pressure controller (12) coupled to an output of said source;
a first processor (112) configured to calculate an internal torque value (114) based on a motor current value (110) and a motor constant $k_e$;
a second processor (116) configured to calculate a target pressure value (62) corresponding to a target pressure of the pump (30) based on a difference between said internal torque value (114) and a loss torque value (108); and
a third processor (109) configured to calculate said loss torque value (108) based on a temperature value (104) and a motor RPM value (106);
wherein a pressure difference is determined based on the difference between an instantaneous pressure of the pump and the target pressure value (62), and a motor control signal is generated that corresponds to the pressure difference to control the electric motor (31) to drive the pump (30) at the target pressure; and
wherein said pressure controller (12), based upon a difference between an instantaneous fluid pressure value (64) and a target pressure value (62), generates a setpoint value (118) which influences power supplied to said motor (31), to bring said instantaneous pressure value (64) toward said target pressure value (62).

2. The apparatus according to claim 1, wherein said second processor (109) uses a performance characteristic matrix (102) in calculating said loss torque (108).

3. The apparatus according to claim 1, wherein said pump is a displacement pump (30).

4. The apparatus according to claim 2, wherein said pump is a displacement pump (30).

5. The apparatus according to claim 1, wherein said pump is an internal gear pump (30).

6. The apparatus according to claim 2, wherein said pump is an internal gear pump (30).

7. The apparatus according to claim 1, wherein said pump is a gerotor pump (30).

8. The apparatus according to claim 2, wherein said pump is a gerotor pump (30).

9. The apparatus according to claim 1, wherein said pressure controller (12) is a proportional-integrating (PI) controller.

10. The apparatus according to claim 1, wherein said third processor (109) uses a performance characteristic matrix (102) in calculating said loss torque value (108).

11. A controller for operating a pump (30) which is driven by an electric motor (31), comprising
a speed-ramp (14) which directs motor start-up steps;
a pressure controller (12) coupled to an output of a source of instantaneous fluid pressure values (64) and which controls post-start-up operation of the motor, said pressure controller (12) configure to calculate a target pressure value (62) corresponding to a target pressure of the pump (30) based on a difference between an internal torque value (114) as a function of a motor current value (110) and a motor constant $k_e$ and a loss torque value (108) as a function of a temperature value (104) and a motor RPM value (106);
said pressure controller (12), based upon a difference between an instantaneous fluid pressure value (64) and a target pressure value (62), generating a setpoint value (118) which influences power supplied to said motor (31), to bring said instantaneous pressure value (64) toward said target pressure value (62); and
a changeover switch (80) which determines when control of said pump is passed from said speed ramp (14), handling a start-up mode, to said pressure controller (12), handling a continuous-operation mode.

* * * * *